(12) United States Patent
DiCicco

(10) Patent No.: US 9,789,939 B1
(45) Date of Patent: Oct. 17, 2017

(54) ADAPTIVE PINGER

(71) Applicant: Thomas DiCicco, Smithtown, NY (US)

(72) Inventor: Thomas DiCicco, Smithtown, NY (US)

(*) Notice: Subject to any disclaimer, the term of this patent is extended or adjusted under 35 U.S.C. 154(b) by 221 days.

(21) Appl. No.: 14/663,595

(22) Filed: Mar. 20, 2015

Related U.S. Application Data

(60) Provisional application No. 62/003,529, filed on May 27, 2014, provisional application No. 61/980,460, filed on Apr. 16, 2014.

(51) Int. Cl.
| | | |
|---|---|---|
| *B63C 7/26* | (2006.01) | |
| *G01S 1/72* | (2006.01) | |
| *G01B 21/18* | (2006.01) | |

(52) U.S. Cl.
CPC ........... *B63C 7/26* (2013.01); *G01B 21/18* (2013.01); *G01S 1/72* (2013.01)

(58) Field of Classification Search
CPC ............. B63C 7/26; G01S 1/72; G01B 21/18
See application file for complete search history.

(56) References Cited

U.S. PATENT DOCUMENTS

| | | | | |
|---|---|---|---|---|
| 3,229,311 A * | 1/1966 | Maes | ............... | B63B 22/003 367/4 |
| 3,992,692 A | 11/1976 | Filer | | |
| 4,044,611 A * | 8/1977 | Kaname | ............... | G01D 11/245 367/134 |
| 5,007,285 A * | 4/1991 | Dahlen | ............... | B63B 22/18 367/4 |
| 8,044,772 B1 * | 10/2011 | Roe | ............... | B60K 28/06 180/272 |
| 2007/0089349 A1 * | 4/2007 | Skjold-Larsen | ....... | A01K 73/02 43/9.1 |
| 2016/0159446 A1 * | 6/2016 | Covelli | ............... | B63B 45/04 340/984 |
| 2016/0272287 A1 * | 9/2016 | Covelli | ............... | B63B 45/04 |

FOREIGN PATENT DOCUMENTS

| | | | | |
|---|---|---|---|---|
| GB | 790235 A * | 2/1958 | ............ | G08C 23/02 |
| WO | WO 2013088275 A1 * | 6/2013 | ............ | G01S 1/725 |

* cited by examiner

*Primary Examiner* — Daniel Pihulic
(74) *Attorney, Agent, or Firm* — Cowan, Liebowitz & Latman, P.C.; Steven D. Underwood

(57) ABSTRACT

An exemplary aspect comprises a self contained acoustic beacon comprising: (a) an acoustic transducer; (b) an acoustic amplifier; and (c) a depth calculator. An exemplary aspect comprises a self contained acoustic beacon comprising: (a) an acoustic transducer; (b) an acoustic amplifier; (c) a water sensor; and (d) a battery life controller. An exemplary aspect comprises a self contained acoustic beacon comprising: (a) an acoustic transducer; (b) an acoustic amplifier; (c) a water sensor; and (d) a waterproof cover with at least one water-dissolvable portion, wherein the water-dissolvable portion dissolves within a pre-determined period of time, and wherein the beacon is powered on when water is detected by the water sensor.

12 Claims, 3 Drawing Sheets

ADAPTIVE PINGER

CROSS-REFERENCE TO RELATED APPLICATIONS

This application claims priority to U.S. Provisional Pat. App. No. 61/980,460, filed Apr. 16, 2014, entitled "Adaptive Pinger," and to U.S. Provisional Pat. App. No. 62/003,529, filed May 27, 2014, entitled "Adaptive Pinger." The entire contents of those applications are incorporated herein by reference.

INTRODUCTION

Previous technology for locating aircraft "black boxes" has several limitations: short battery life for the "pinger", limited detection range, and bearing ambiguity. Moreover, extreme ocean depths may further exacerbate the location of the devices because of pinger frequency. Previous devices are free-running pingers transmitting at an acoustic frequency of 37.5 kHz, with a claimed battery life of at least 30 days. An example of such a prior art device is described in U.S. Pat. No. 3,992,692, the contents of which are incorporated herein by reference for background purposes.

One exemplary aspect comprises a self contained acoustic beacon comprising: (a) an acoustic transducer; (b) an acoustic amplifier; and (c) a depth calculator.

In one or more exemplary embodiments: (1) the beacon comprises a water sensor; (2) the water sensor causes the beacon to power on when water is sensed; (3) the beacon comprises a ping generator that modifies pings to be generated by the acoustic transducer according to data generated by the depth calculator; (4) the ping generator modifies the acoustic frequency of the pings according to data generated by the depth calculator; (5) the beacon comprises a depth transducer in communication with the depth calculator; (6) the beacon comprises a battery life controller; (7) the battery life controller adjusts temporal frequency of pings to be generated by the acoustic transducer according to data generated by the depth calculator; (8) the battery life controller adjusts pulse power of pings to be generated by the acoustic transducer according to data generated by the depth calculator; (9) the battery life controller delays power on time of the beacon for a pre-set period of time after water is detected by a water sensor; and (10) the beacon comprises a battery life controller that disables at least one of the depth transducer and depth calculator after a pre-set period of time has passed.

An exemplary aspect comprises a self contained acoustic beacon comprising: (a) an acoustic transducer; (b) an acoustic amplifier; (c) a water sensor; and (d) a battery life controller.

In one or more exemplary embodiments: (1) the battery life controller adjusts temporal frequency of pings to be generated by the acoustic transducer according to pulse power of pings to be generated by the acoustic transducer; (2) the battery life controller delays power on time of the beacon for a pre-set period of time after water is detected by the water sensor; (3) the battery life controller disables one or more electronic components of the acoustic beacon after a pre-set period of time has passed.

An exemplary aspect comprises a self contained acoustic beacon comprising: (a) an acoustic transducer; (b) an acoustic amplifier; (c) a water sensor; and (d) a waterproof cover with at least one water-dissolvable portion, wherein the water-dissolvable portion dissolves within a pre-determined period of time, and wherein the beacon is powered on when water is detected by the water sensor.

The above and other features of exemplary aspects and embodiments will be apparent from the drawings and detailed description provided herein.

DETAILED DESCRIPTION OF SELECT EXEMPLARY EMBODIMENTS

Figure 1:
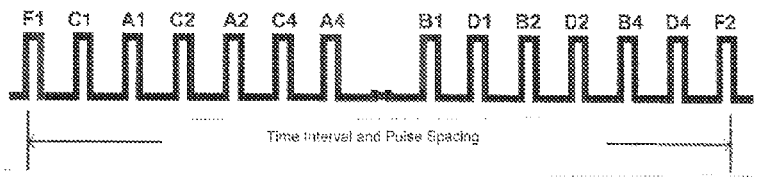
FIG. 1 depicts an example of an altitude reporting format.

An exemplary embodiment provides improved technology and functionality for locating a missing aircraft (and/or black boxes) underwater. Novel features of one or more exemplary embodiments may include adaptive technology to provide information on the device resting depth, as well as other features that significantly extend battery life and aid in location of the device.

In an exemplary embodiment, the device may be activated when it senses that it is located in water (salt or fresh), via an integral water sensor. The water sensor may be, for example, a conductive type or a pressure activated type, activated by being immersed in water. The water sensor may cause a "power-on" switch to close, thereby providing power to various modules/components in the device.

Once in water of any depth, a depth pressure transducer (or other depth measurement component) may send a signal to a "depth calculation" component for calculation of approximate depth.

A suitable transducer may be of the type manufactured by Omega for naval underwater applications and which meets rigorous Mil Standards (model PX2471 MIL-T-24742 (SH) NAVAL SERIES). This device converts pressure exerted by the water to an electrical current. The current may be converted by analog circuits to a digital word which represents a determination of the device's final depth, and may be used by the "on-board" processor within the device.

In an exemplary embodiment, the pressure sensing component may interact with one or more adaptive features of the device, so as to provide information on the device depth, as well as the other features specifically to extend battery life and aid in location of the device.

The depth information may be sent to a Ping Frequency Generator (PFG). This PFG component may generate a stable but variable (under program control), acoustic frequency which may shift from a nominal operating frequency based on calculated device depth.

In cases involving searches at great depths, having information on the depth of the device will greatly enhance the ability of searchers to find the device (and thus a corresponding debris field, for example). This is especially helpful when the underwater terrain is mountainous.

The search ship may be very close to the device, but on the wrong side of a mountain or range, with the pinger device being in a nearby deep valley on the other side of the mountain or range. If a "ping" is received from the device, a quick measurement/determination of its pulse frequency will tell the searchers which area would be the likely location (for example, by comparison to area depth data/charts or by comparison to real time bathymetric measurements).

By way of a non-limiting example, previous black boxes emit a fixed ping acoustic signal at a frequency at approximately 37.5 kHz. In contrast, an exemplary embodiment may report its depth by emitting a ping acoustic signal at a varying frequency, by shifting from a nominal or baseline frequency by 1 Hz per meter depth (for example). Having depth information, even approximate, will greatly assist in locating the device.

Another valuable output from knowing the device depth is that the normal acoustic emission frequency of the locator ping can be adjusted for significant depth. A preferred acoustic frequency at great depths is 10 kHz, providing the greatest detection range. If the 10 kHz pulse frequency is heard by the searchers, and they can later (or simultaneously) detect the pulse that carries depth information, the chances of discovery are greatly increased.

The adaptive algorithm may provide that at least one high power pulse per burst be of a frequency that reports depth, and the rest of the pulses in the burst can be of the optimum frequency for detection range (10 kHz in this example), The algorithms may linearly scale pulse frequency with depth, or may include more complex algorithms that optimize the trade off between detection range and depth reporting.

For example, once the device is at extreme depths, the resolution may be more coarse, shifting 1 Hz per 10 meters, for example, so as to operate at or near the optimum frequency for the best detection range performance and still provide depth information. It is important to recognize that the searchers will know the frequency control algorithms, and this foreknowledge will prevent ambiguity in interpreting the depth represented by the frequency of the depth reporting pulse. By way of example, if the search area is in an area which only includes depths greater than 5000 meters, the searcher would be aware that the frequency control algorithm has changed to one that may be more course and will be operating in the range of 10 KHz.

The depth information may also be sent to a Battery Life Controller component, in which the depth information may be immediately used to conserve battery power should the device descend to a significant depth (which would make the task of locating the device much more difficult and time consuming).

The Battery Life Controller component may conserve power by following various power conservation algorithms (the details of which will be apparent to those skilled in the art) that may adjust both ping repetition rate and the actual power of the acoustic ping pulse.

For example, at significant depths a slow, high power pulse may be desirable, whereas at shallow depths a higher rate, low power pulse may be the best solution. The two control signals may be fed to the Acoustic Power Amplifier along with the output from the ping frequency generator, for finalization of the pulse waveform. It should be recognized that the final waveform may be a complex varying combination of pulse width, amplitude, pulse rate, pulse frequency, and may even be a burst of complex pulses. The exact waveform construction will preferably be known to persons that are searching for the device. The first pulse in a sequence may be of a frequency that reports depth, while the remaining pulses in the sequence may be of an optimal detection range frequency with "battery conserving" pulse amplitude control also applied.

The finalized pulse waveform may be amplified and fed to the Acoustic Output Transducer, where those searching for the device will be listening with hydrophones, and other sophisticated sonar equipment. This equipment may include properly equipped autonomous underwater vehicles, submarines, and towed acoustic arrays, such as those commonly used to detect enemy submarines.

In an exemplary embodiment, the device may operate on a battery selected for long life, significant capacity, and which may be charged from an external power source (if available). With battery technology quickly evolving in the world today, consideration should be employed in the device to allow it to easily utilize the newest technology as it evolves. With today's technology the device may use Nickel Cadmium, Lithium Ion, or Lithium Polymer (LiPo) batteries, for example. All of these battery types are long life, acceptable capacity, and chargeable, with the LiPo battery being the lightest of weight (a consideration on anything to be installed on-board an aircraft).

An exemplary embodiment of the device may be larger than the previous black box pingers. It also may be a stand alone "locator" device that has a larger waterproof and damage-proof case, which will carry the battery and the adaptive acoustic electronics.

There may not be sufficient room for the certain embodiments of the device in the current tail sections of existing aircraft or where the "black boxes" currently are carried. This device can be placed anywhere in the aircraft, with the best area being the rear section of the cargo hold or some other available rear fuselage space. Since in these cases the device is not necessarily in the same area as the black boxes, it will be targeted to helping in the discovery of the debris field.

Once the location of the device is known, then the actual discovery of the black boxes can be undertaken, recognizing that the short life of the pinger currently used on black boxes may have already expired. An additional enhancement over the current design allows for a battery charging voltage to keep the batteries at full performance at all times. The current black box pinger battery life is dependent on the storage conditions (temperature and humidity) of the "pinger", and is reported by the manufacturers to be approximately 30 days.

The new device is not necessarily designed for recording and storing any flight or voice data, but may optionally be so equipped, and provide some degree of back-up to the black boxes.

The above description describes certain embodiments to report device depth by converting a depth pressure measurement to a variable frequency ping. The frequency of the ping may be converted by an algorithm which is known to potential searchers that can be converted directly to depth.

Certain limitations may apply in the acoustic transducer frequency range, which could prevent the device from emitting pings at any required frequency, as necessary to report the device depth. The acoustic transducer may be comprised of a piezo-electric device that has a narrower frequency dynamic range than would be required to accommodate the depth reporting feature described above.

In most aircraft, a beacon transponder routinely reports the plane's altitude by responding to a "Mode C" interrogation from a beacon radar system. The response from the transponder sends out a code made up of 4 numerals, with each numeral ranging from 0-7, known in the industry as an "octal" number. The number representing altitude is coded in such a way that if a "bit" was lost or not received by the beacon radar system, the altitude difference would not be more than one LSB (least significant bit), thereby preventing a gross error in reporting altitude. This code will provide 4096 altitude steps and cover a range to over 125,000 feet, for example, in 100 ft. steps.

A full description of Mode C altitude coding is provided here ht://www.airsport-corp.com/modec.htm The table shown in FIG. 1 includes an example of the altitude reporting format.

Embodiments described herein include a method to overcome some of the above limitations if necessary, because of the inability of the acoustic transducer to produce the required frequency for the "depth reporting ping".

An embodiment comprises a method to report depth with a certain ping code. The device may use a code (similar to Mode C for aircraft) to report depth (instead of altitude), and do it by coding the ping response to provide up to 3 acoustic pulses for each of the 4 numerals (A, B, C, D) representing the depth. The pings may follow a certain time spacing so that each numeral may be determined individually by whether a ping is present or not. The code may be framed by a start and stop ping of certain time spacing analogous to the Mode C response. The pings may serve a dual purpose in this situation; they would first provide the acoustic signal to allow the device to be located, and its coding would report depth. The number of pings and the exact code make-up are provided for illustrative purposes and are meant to be non-limiting examples.

A device embodiment adaptively conserves battery power by controlling various features of the acoustic pulse sequence.

An embodiment may adjust its response frequency for extreme depths, from a normal 37.5 kHz to one in the range of 10 kHz, thereby providing greater detection ranges.

Conservation of battery power is provided by certain embodiments. An improvement in battery power conservation described herein is to disable certain portions of the electronic circuits in the device at a time when they are no longer useful. Specifically there is a section of the device that determines depth. This is made up of a pressure transducer and associated electronics. An embodiment disables this section of the electronic circuits once the device has achieved a resting depth and remains there for a period of 24 hours. The assumption here is that the device depth will have settled at some specific resting depth and repeated measurement and calculation of this depth is no longer necessary, therefore the circuits for such can be disabled to conserve battery power. The device will continue to report this now "fixed" resting depth for all future acoustic emanations that report depth.

Another method embodiment for saving battery life is applicable to not only the Adaptive Pinger, but can be applied to existing pingers. After a plane sinks in the ocean, there is a time lapse between the time of impact and the time required for searchers to reach the scene and then commence "listening" for the pinger emanations. An embodiment makes significant use of this fact.

Assuming that current black box pingers last 30 days as the manufacturers suggest, there is no need to start the adaptive pinger described herein on immediate contact with water. The first reason is that there is likely no one looking for or equipped to look for the device, so the battery power expended early-on is all wasted. Secondly, if the existing pingers on the black boxes are activated immediately, it is redundant to activate the adaptive pinger at the same time, consuming both battery sources.

In an embodiment, the adaptive pinger is configured to have a "delayed start" of 30 days, allowing the maximum use of the existing black box pinger battery and allowing time for searchers to be in the area and listening with the proper equipment. Consider too, that if the adaptive pinger's battery conserving features allow it to last say 3 months, then this ping time is additive to the ping time of the existing black box pingers and now there are 4 months of pings. If there is a second adaptive pinger (or a second adaptive pinger battery) on board that is programmed to activate after 4 months, the total time for pings is now 8 months. In other words, two or three appropriately configured adaptive pingers (or adaptive pinger batteries) would make pings available for a year. This is a very significant improvement to the state of the art.

The delay start feature may be added to existing pingers, by mechanical or electrical retrofit, with mechanical being the simplest and lowest cost method. Since there are many designs in use, a special cover for the water sensor may be fitted over it to block is from sensing that it is submerged. The cover may have a plug that will effervesce in the presence of water and thereby dissolve over time. The time to dissolve may be days or a month for example, and this simple retrofit may allow all the benefits of a delayed start (i.e., searchers are in the right area with the proper search equipment).

Certain embodiments described herein adjust ping frequency for extreme depths, from a normal 37.5 kHz to one in the range of 10 kHz, thereby providing greater detection ranges. As noted above a single acoustic transducer may not be able to provide the necessary frequency dynamic range to allow this to happen.

In this event, a device embodiment may be equipped with a first transducer that may be used in shallow depths at 37.5 KHz and a second transducer that would be used at extreme depths at 10 kHz. (Note that the exact frequency may be changed from those proposed, so these should be considered non-limiting examples).

The depth of the water in the area that is being searched is known to searchers, and their foreknowledge of the coding algorithms will provide them with the information to know what signals are to be expected for that area.

Figure 2:
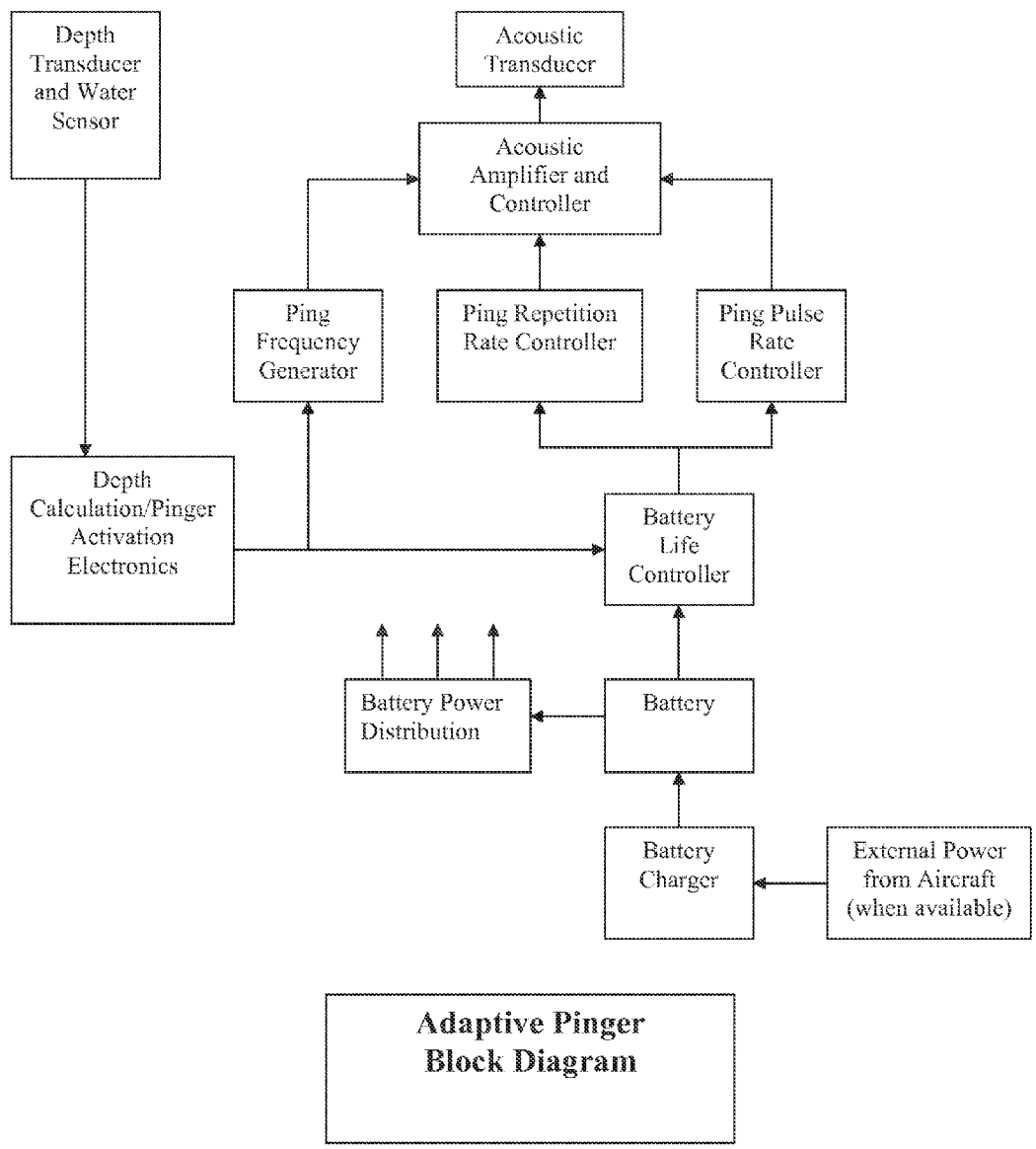
FIG. 2 is a block diagram of an exemplary embodiment.

Additional details of exemplary embodiments will be apparent to those skilled in the art, after examining the block diagram in FIG. 2.

Figure 3:
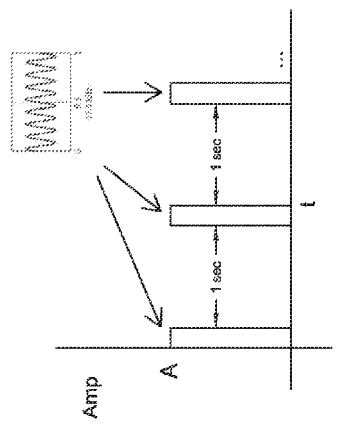
FIG. 3 depicts a waveform of a current technology black box pinger.

FIG. 3 shows a waveform of a current technology black box pinger. Three pings are shown but the pinger is actually free running until it runs out of battery. Each pulse is made up of an acoustic frequency of 37.5 KHz, at amplitude "A" and repetition rate of 1 sec.

Figure 4:
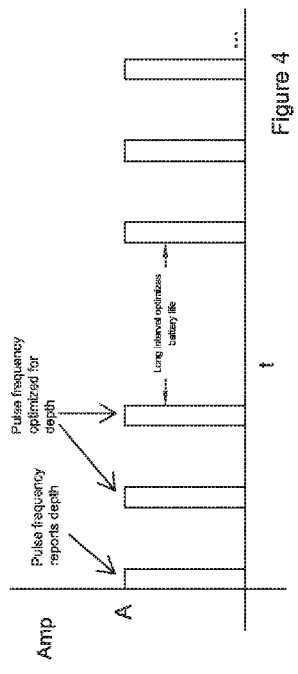
FIG. 4 depicts a waveform of an exemplary embodiment whereby the first pulse carries depth data (frequency derived by the depth conversion algorithm) and the remaining pulses in the sequence are optimized for detection range.

FIG. 4 shows a waveform of an embodiment whereby the first pulse carries depth data (frequency derived by the depth conversion algorithm) and the remaining pulses in the sequence are optimized for detection range. The "long interval" between bursts is optimized for battery life maximization.

Figure 5:
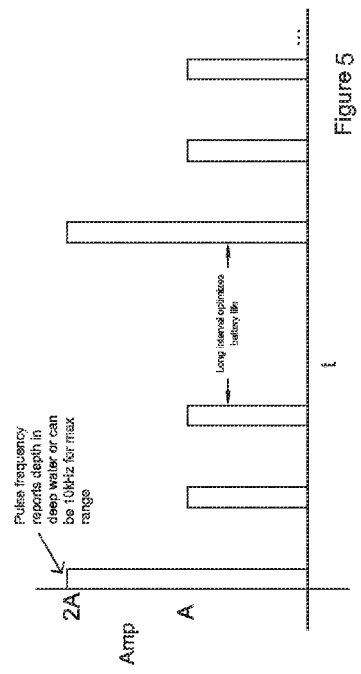
FIG. 5 depicts a waveform of an embodiment applicable to deep water.

FIG. 5 shows a waveform of an embodiment applicable to deep water, whereby the first pulse in the sequence can be at a significantly higher pulse power ("2 A" in this example), and can report either depth (by its frequency) or be optimized for long range at 10 KHz. The remaining pulses in the sequence can carry depth data or be at or near 10 Khz, and at amplitudes and repetition rates under the adaptive algorithm control of the device.

While certain exemplary aspects and embodiments have been described herein, many alternatives, modifications, and variations will be apparent to those skilled in the art. Accordingly, exemplary aspects and embodiments set forth herein are intended to be illustrative, not limiting. Various modifications may be made without departing from the spirit and scope of the disclosure.

I claim:

1. A self contained acoustic beacon comprising:
an acoustic transducer;
an acoustic amplifier;
a depth calculator;
a water sensor that causes said beacon to power on when water is sensed; and
a signal generator that optimizes a detection range of signals generated by said acoustic transducer by selecting an acoustic frequency of said signals according to data generated by said depth calculator.

2. An acoustic beacon as in claim 1, further comprising a depth transducer in communication with said depth calculator.

3. An acoustic beacon as in claim 1, further comprising a battery life controller.

4. An acoustic beacon as in claim 3, wherein said battery life controller adjusts temporal frequency of pings to be generated by said acoustic transducer according to data generated by said depth calculator.

5. An acoustic beacon as in claim 3, wherein said battery life controller adjusts pulse power of pings to be generated by said acoustic transducer according to data generated by said depth calculator.

6. An acoustic beacon as in claim 1, further comprising a battery life controller that delays power on time of said beacon for a pre-set period of time after water is detected by said water sensor.

7. An acoustic beacon as in claim 2, further comprising a battery life controller that disables at least one of said depth transducer and depth calculator after a pre-set period of time has passed.

8. A self contained acoustic beacon comprising:
an acoustic transducer;
an acoustic amplifier;
a water sensor; and
a battery life controller;
wherein said battery life controller adjusts temporal frequency of pings to be generated by said acoustic transducer according to pulse power of pings to be generated by said acoustic transducer.

9. A self contained acoustic beacon comprising:
an acoustic transducer;
an acoustic amplifier;
a water sensor; and
a battery life controller;
wherein said battery life controller delays power on time of said beacon for a pre-set period of time after water is detected by said water sensor.

10. A self contained acoustic beacon comprising:
an acoustic transducer;
an acoustic amplifier;
a water sensor; and
a waterproof cover containing said water sensor and having at least one water-dissolvable portion,
wherein said water-dissolvable portion dissolves within a pre-determined period of time, and
wherein said beacon is powered on when water is detected by said water sensor.

11. An acoustic beacon as in claim 1, wherein a pulse code carries depth data.

12. An acoustic beacon as in claim 11, wherein said depth data is derived by a depth conversion algorithm.

* * * * *